(12) United States Patent
Adisaw et al.

(10) Patent No.: US 12,393,188 B2
(45) Date of Patent: Aug. 19, 2025

(54) DEVICE FOR ASSISTING EQUIPMENT RESTORATION WORK AND METHOD FOR GENERATING EQUIPMENT RESTORATION WORK ASSIST INFORMATION

(71) Applicant: AMADA CO., LTD., Kanagawa (JP)

(72) Inventors: Rini Adisaw, Kanagawa (JP); Katsumi Watanabe, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 379 days.

(21) Appl. No.: 18/013,122

(22) PCT Filed: Jul. 5, 2021

(86) PCT No.: PCT/JP2021/025300
§ 371 (c)(1),
(2) Date: Dec. 27, 2022

(87) PCT Pub. No.: WO2022/009832
PCT Pub. Date: Jan. 13, 2022

(65) Prior Publication Data
US 2023/0244222 A1 Aug. 3, 2023

(30) Foreign Application Priority Data
Jul. 7, 2020 (JP) ................................. 2020-116799

(51) Int. Cl.
*G05B 23/02* (2006.01)
(52) U.S. Cl.
CPC ...... *G05B 23/0289* (2013.01); *G05B 2223/02* (2018.08)
(58) Field of Classification Search
CPC ............ G05B 23/0289; G05B 2223/02; G05B 23/0286; G06Q 10/06312; G06Q 10/20; G06Q 10/06311
See application file for complete search history.

(56) References Cited

U.S. PATENT DOCUMENTS

| 2010/0299172 A1* | 11/2010 | Nottoli | G06F 3/0483 |
| | | | 705/29 |
| 2014/0198630 A1* | 7/2014 | Nof | H04L 45/28 |
| | | | 370/216 |

(Continued)

FOREIGN PATENT DOCUMENTS

| JP | 10-097317 A | 4/1998 |
| JP | 2002-224762 A | 8/2002 |

(Continued)

OTHER PUBLICATIONS

Extended European Search Report for corresponding EP Application No. 21838283.6 dated Nov. 22, 2023.

(Continued)

*Primary Examiner* — Santosh R Poudel
(74) *Attorney, Agent, or Firm* — Renner, Otto, Boisselle & Sklar, LLP

(57) ABSTRACT

A restoration work information storage unit stores a work item for restoration that is set for each location at which an abnormality is expected to occur in equipment to be managed, and priority information indicating a priority of execution for each of the work items. Upon detecting that an abnormality has occurred in the equipment and an operation of the equipment has been stopped, a restoration assist information generation unit generates restoration assist information, in which the work items for restoring the equipment are arranged in the order of execution according to the priority information, based on information of a location at which the abnormality has occurred. Upon detecting that a state of any location in the equipment has changed before a restoration work based on the restoration assist information is completed, a restoration assist information update unit updates the restoration assist information.

5 Claims, 4 Drawing Sheets

(56) References Cited

U.S. PATENT DOCUMENTS

| | | | | |
|---|---|---|---|---|
| 2014/0297354 | A1* | 10/2014 | Kogiso | G06F 9/46 |
| | | | | 705/7.26 |
| 2016/0133070 | A1* | 5/2016 | Ikeda | G07C 5/0808 |
| | | | | 701/31.4 |
| 2016/0334800 | A1* | 11/2016 | Han | G05D 1/0274 |
| 2019/0235502 | A1* | 8/2019 | Lindsey | G05D 1/46 |
| 2019/0367190 | A1* | 12/2019 | Bewlay | B64F 5/60 |
| 2020/0151676 | A1* | 5/2020 | Mitchell | H04W 4/029 |

FOREIGN PATENT DOCUMENTS

| | | | | |
|---|---|---|---|---|
| JP | 2011104658 | A | * | 6/2011 |
| JP | 2012164120 | A | | 8/2012 |
| JP | 2017175611 | A | * | 9/2017 |
| JP | 2019-28556 | A | | 2/2019 |
| JP | 2020-102221 | A | | 7/2020 |

OTHER PUBLICATIONS

International Search Report for corresponding Application No. PCT/JP2021/025300, mailed Sep. 14, 2021.
Written Opinion for corresponding Application No. PCT/JP2021/025300, mailed Sep. 14, 2021.

* cited by examiner

2

DEVICE FOR ASSISTING EQUIPMENT RESTORATION WORK AND METHOD FOR GENERATING EQUIPMENT RESTORATION WORK ASSIST INFORMATION

This application is a national phase of International Application No. PCT/JP2021/025300 filed Jul. 5, 2021, which claims priority to Japan Application No. 2020-116799 filed Jul. 7, 2020, each of which is hereby incorporated herein by reference in its entirety.

TECHNICAL FIELD

The present disclosure relates to a device for assisting equipment restoration work and a method for generating equipment restoration work assist information.

BACKGROUND ART

When an abnormality occurs in automatically operated equipment and the operation thereof is stopped, a restoration work is necessary to restore the state to an operable state again. Work items and work procedures necessary for the restoration work differ depending on the equipment and the occurrence situation of the abnormality. Therefore, a worker determines the work items and work procedures necessary for the restoration based on his/her knowledge and experience to perform the corresponding work.

CITATION LIST

Patent Literature

Patent Literature 1: Japanese Patent Application Laid-Open Publication No. 2002-224762

SUMMARY

However, when a worker who has little experience in equipment management performs the restoration work, it may be difficult to properly determine the necessary work items and work procedures. Particularly, if the state of any location of the equipment has changed during the restoration work, e.g. if a new abnormality has occurred, it is necessary to grasp an item for which the work has already been completed, an item for which the work has not been completed, and a location at which the abnormality has occurred, and then to rearrange the work items and work procedures to be executed thereafter. Therefore, there is a problem that the processing becomes complicated.

An object of one or more embodiments is to provide a device for assisting equipment restoration work that generate information for assisting a restoration work performed by a worker when an abnormality occurs in automatically operated equipment and the equipment is stopped, and a method for generating equipment restoration work assist information.

According to a first aspect of the one or more embodiments, a device for assisting equipment restoration work is provided, which includes a restoration work information storage unit configured to store a work item for restoration and priority information, the work item being set in advance for each location at which an abnormality is expected to occur in equipment to be managed, the priority information indicating a priority of execution for each of the work items, a state information acquisition unit configured to acquire state information of a predetermined location of the equipment, a restoration assist information generation unit configured to generate, when it is detected that an abnormality has occurred in the equipment and an operation of the equipment has been stopped, restoration assist information, in which the work items for restoring the equipment are arranged in the order of execution according to the priority information, based on information of a location at which the abnormality has occurred and the information stored in the restoration work information storage unit, and a restoration assist information update unit configured to update, when it is detected that a state of any location in the equipment has changed based on the information acquired by the state information acquisition unit before a restoration work based on the restoration assist information is completed, the generated restoration assist information based on information of the location at which the change has occurred.

According to a second aspect of the one or more embodiments, a method for generating equipment restoration work assist information is provided, which includes storing, by a storage unit, a work item for restoration and priority information, the work item being set in advance for each location at which an abnormality is expected to occur in equipment to be managed, the priority information indicating a priority of execution for each of the work items, acquiring state information of a predetermined location of the equipment, generating, when it is detected that an abnormality has occurred in the equipment and an operation of the equipment has been stopped, restoration assist information, in which the work items for restoring the equipment are arranged in the order of execution according to the priority information, based on information of a location at which the abnormality has occurred and the information stored in the storage unit, and updating, when it is detected that a state of any location in the equipment has changed before a restoration work based on the restoration assist information is completed, the generated restoration assist information based on information of the location at which the change has occurred.

According to the device for assisting equipment restoration work and the method for generating equipment restoration work assist information of the one or more embodiments, it is possible to generate information for assisting a restoration work performed by a worker when an abnormality has occurred in automatically operated equipment.

DESCRIPTION OF EMBODIMENT

As one or more embodiments, a description will be given of a device for assisting equipment restoration work (hereinafter referred to as a "restoration work assist device") that is connected to a tool changer (ATC) for automatically changing a tool used in a sheet metal bending machine (a press brake) and generates information for assisting a restoration work of the tool changer.

<Configuration of Tool Changer Using Restoration Work Assist Device According to One or More Embodiments>

Figure 1:
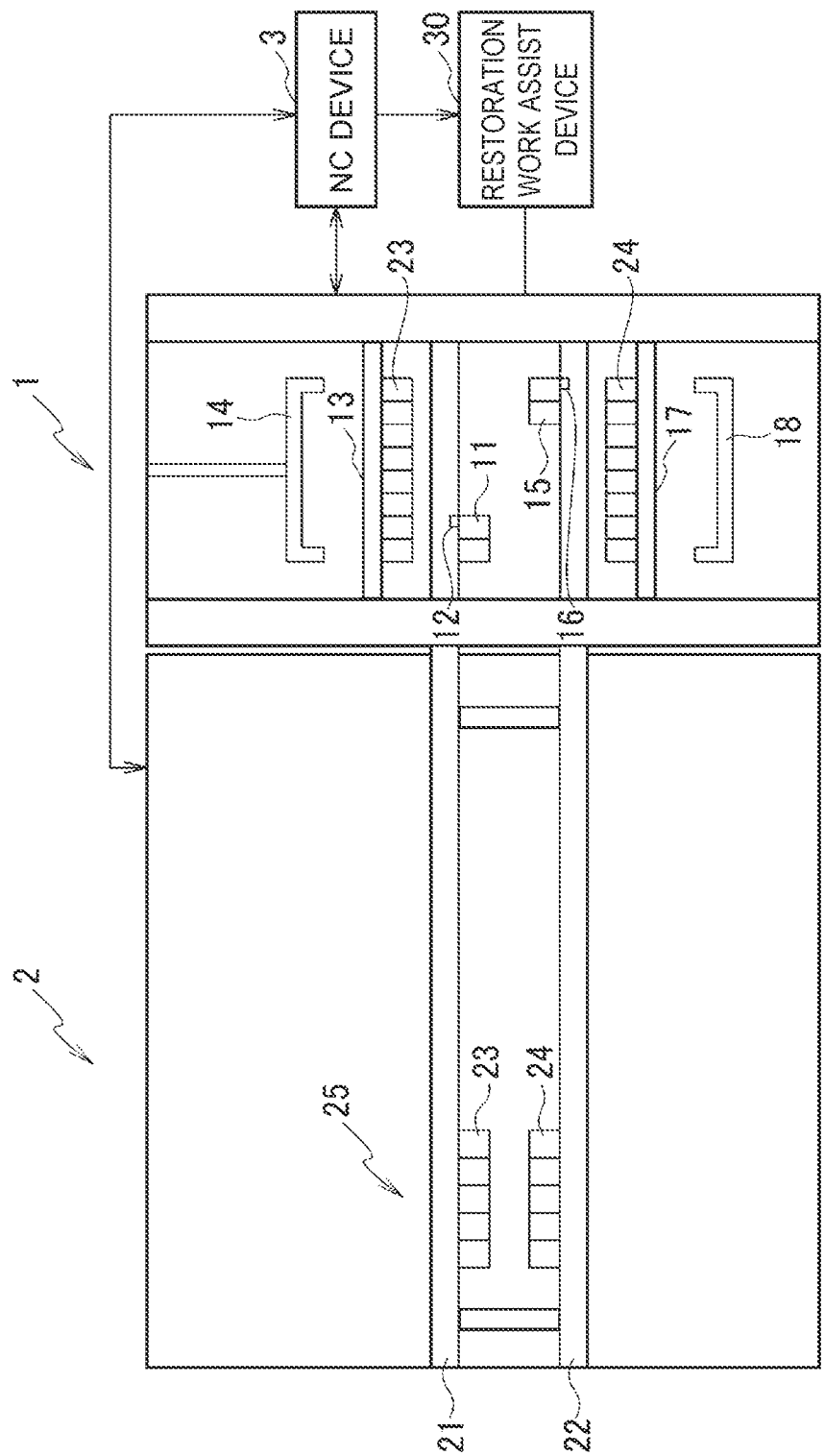
FIG. 1 is a front view showing configurations of a tool changer and a bending machine equipped with a restoration work assist device of one or more embodiments.

In FIG. 1, a tool changer 1 is installed close to a press brake 2 and is communicably connected to an NC device 3 that controls the tool changer 1 and the press brake 2.

The press brake 2 is a device that bends a workpiece to be processed at a predetermined position, to which an upper table 21 and a lower table 22 that are long in the left-right direction are provided so as to correspond vertically. A punch 23 is attached to the upper table 21, and a die 24 is attached to the lower table 22. A processing station 25 is constructed by attaching the punch 23 and the die 24 so as to form a pair.

At each processing station 25, when the upper table 21 is lowered while the workpiece is positioned on the die 24, the workpiece is sandwiched between the punch 23 and the die 24 and bent.

The tool changer 1 includes a punch side finger 11, a punch side finger sensor 12, a punch rack 13, a punch stocker 14, a die side finger 15, a die side finger sensor 16, a die rack 17, and a die stocker 18. A restoration work assist device 30 that manages the tool changer 1 is connected to the tool changer 1 via the NC device 3.

The punch side finger 11 is configured to be movable to and from the press brake 2, and grips the punch 23 that has been used by the press brake 2 and transports the punch 23 into the tool changer 1. Further, the punch side finger 11 grips the punch 23 to be newly used and transports the punch 23 to the press brake 2. The punch side finger sensor 12 detects the operation state of the punch side finger 11, whether or not there is the punch 23 being gripped, the installation state, and the like.

The punch rack 13 includes a space for storing a plurality of the punches 23. The punch stocker 14 stores the punch 23, which is transported from the press brake 2 by the punch side finger 11, at a predetermined position of the punch rack 13. Further, the punch stocker 14 takes out the punch 23, which is to be transported to the press brake 2, from the punch rack 13 and moves the punch 23 to the punch side finger 11.

In the same manner, the die side finger 15 is configured to be movable to and from the press brake 2, and grips the die 24 that has been used by the press brake 2 and transports the die 24 into the tool changer 1. Further, the die side finger 15 grips the die 24 to be newly used and transports the die 24 to the press brake 2. The die side finger sensor 16 detects the operation state of the die side finger 15, whether or not there is the die 24 being gripped, the installation state, and the like.

The die rack 17 stores a plurality of the dies 24. The die stocker 18 stores the die 24, which is transported from the press brake 2 by the die side finger 15, in the die rack 17. Further, the die stocker 18 takes out the die 24, which is to be transported to the press brake 2, from the die rack 17 and moves the die 24 to the die side finger 15.

Figure 2:
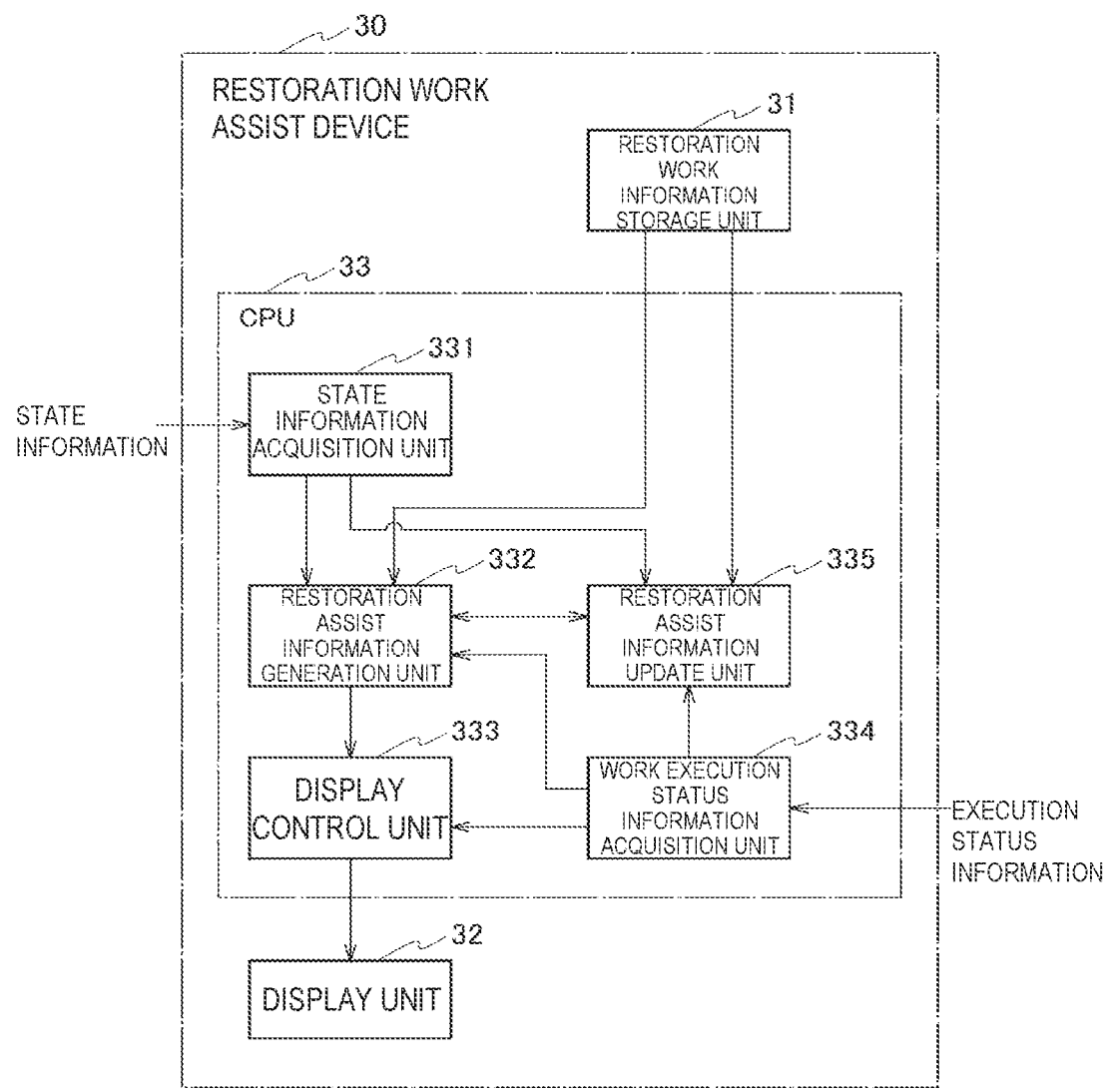
FIG. 2 is a block diagram showing a configuration of the restoration work assist device of the one or more embodiments.

As shown in FIG. 2, the restoration work assist device 30 includes a restoration work information storage unit 31, a display unit 32 as an output unit, and a CPU 33. The restoration work information storage unit 31 stores a work item for restoration, which is set in advance for each location at which an abnormality is expected to occur in the tool changer 1, and priority information indicating a priority of execution for each of the work items. Note that the priority of execution for each of the work items is set in consideration of the work order from the perspective of the structure of the machine. The display unit 32 includes a display screen.

The CPU 33 includes a state information acquisition unit 331, a restoration assist information generation unit 332, a display control unit 333, a work execution status information acquisition unit 334, and a restoration assist information update unit 335. The state information acquisition unit 331 acquires operation state information and the like detected by the punch side finger sensor 12 and the die side finger sensor 16 as state information of a predetermined location in the tool changer 1.

Upon detecting that an abnormality has occurred in the tool changer 1 and the operation has been stopped, the restoration assist information generation unit 332 generates restoration assist information based on information of a location at which the abnormality has occurred and the information stored in the restoration work information storage unit 31. The restoration assist information includes information in which the work items for restoring the equipment are arranged in the order of execution according to the priority. The display control unit 333 causes the display unit 32 to display the restoration assist information generated by the restoration assist information generation unit 332.

The work execution status information acquisition unit 334 acquires information indicating an execution status of a restoration work by a worker. Upon detecting that a state of any location in the tool changer 1 has changed during the restoration work, the restoration assist information update unit 335 updates the restoration assist information, which is generated by the restoration assist information generation unit 332, based on information of the location at which the change has occurred and the information acquired by the work execution status information acquisition unit 334.

<Operation of Tool Changer 1 According to One or More Embodiments>

Figure 3:
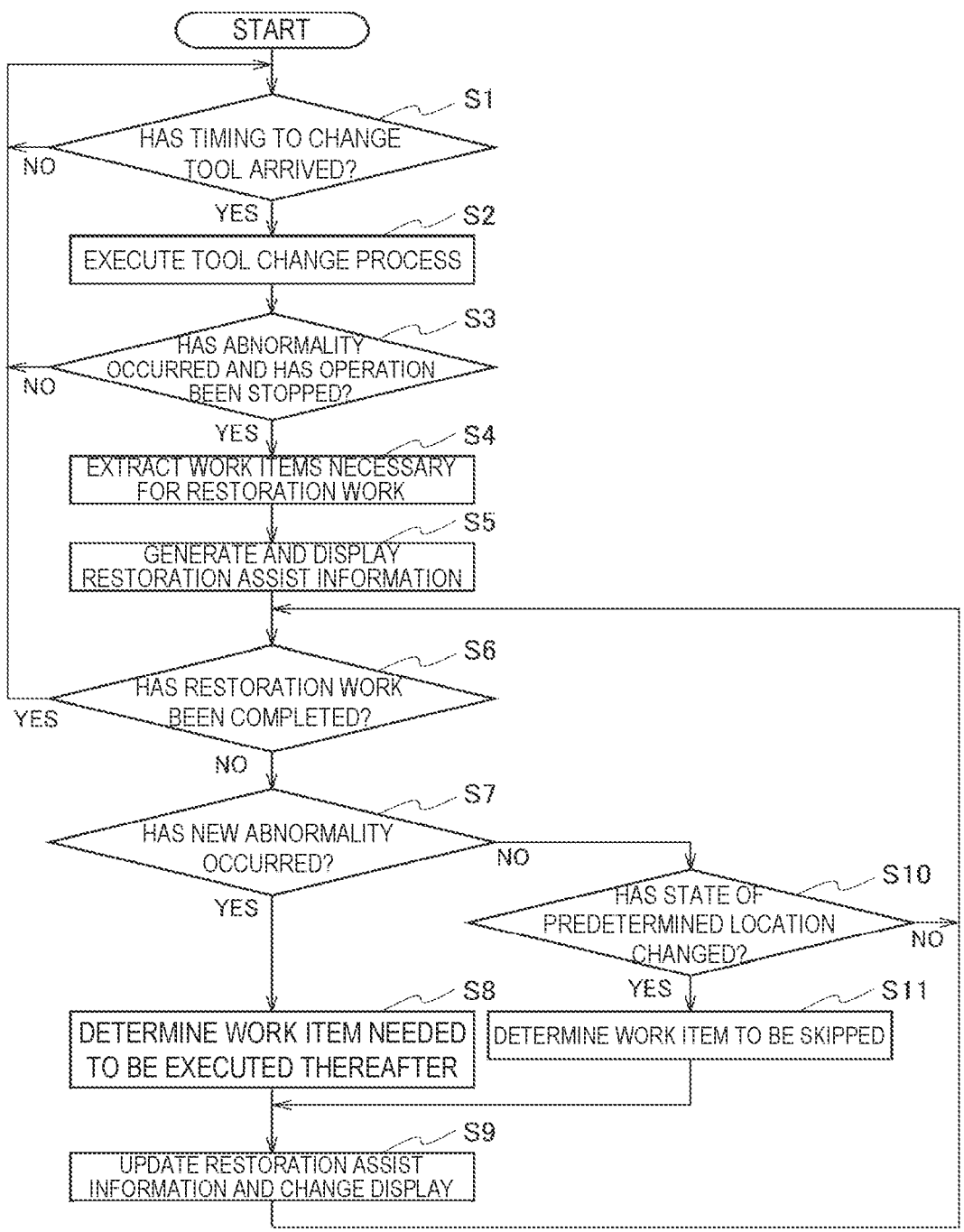
FIG. 3 is a flowchart showing processing executed by the restoration work assist device of the one or more embodiments.

As an operation of the tool changer 1 according to the one or more embodiments, a method for generating equipment restoration work assist information, which is executed by the restoration work assist device 30 when the abnormality occurs in the tool changer 1, will be described with reference to a flowchart in FIG. 3.

When the timing of changing the tool of the press brake 2 arrives ("YES" in S1), the tool changer 1 executes a tool change process (S2). In the tool change process, the punch side finger 11 removes and grips the punch 23 attached to the processing station 25 of the press brake 2, and transports the punch 23 into the tool changer 1. Then, the punch stocker 14 stores the punch 23, which is transported by the punch side finger 11, in the punch rack 13.

Further, the punch stocker 14 takes out the punch 23 to be used next from the punch rack 13, grips the punch 23, and moves the punch 23 to the punch side finger 11. The punch side finger 11 changes the punch 23 by transporting the punch 23 to the press brake 2 and attaching the punch 23 to the processing station 25. In the same manner, the die 24 to be installed to the press brake 2 is also changed.

If an abnormality occurs in the tool changer 1 and the operation is stopped while the tool changing process is being executed in this manner ("YES" in S3), information of the state is acquired by the state information acquisition unit 331. When the information is acquired by the state information acquisition unit 331, the restoration assist information generation unit 332 specifies a location at which the abnormality has occurred based on sensor information and the like of the respective locations acquired by the state information acquisition unit 331, and extracts a work item necessary for the restoration work from among the information stored in the restoration work information storage unit 31 (S4).

Figure 4:
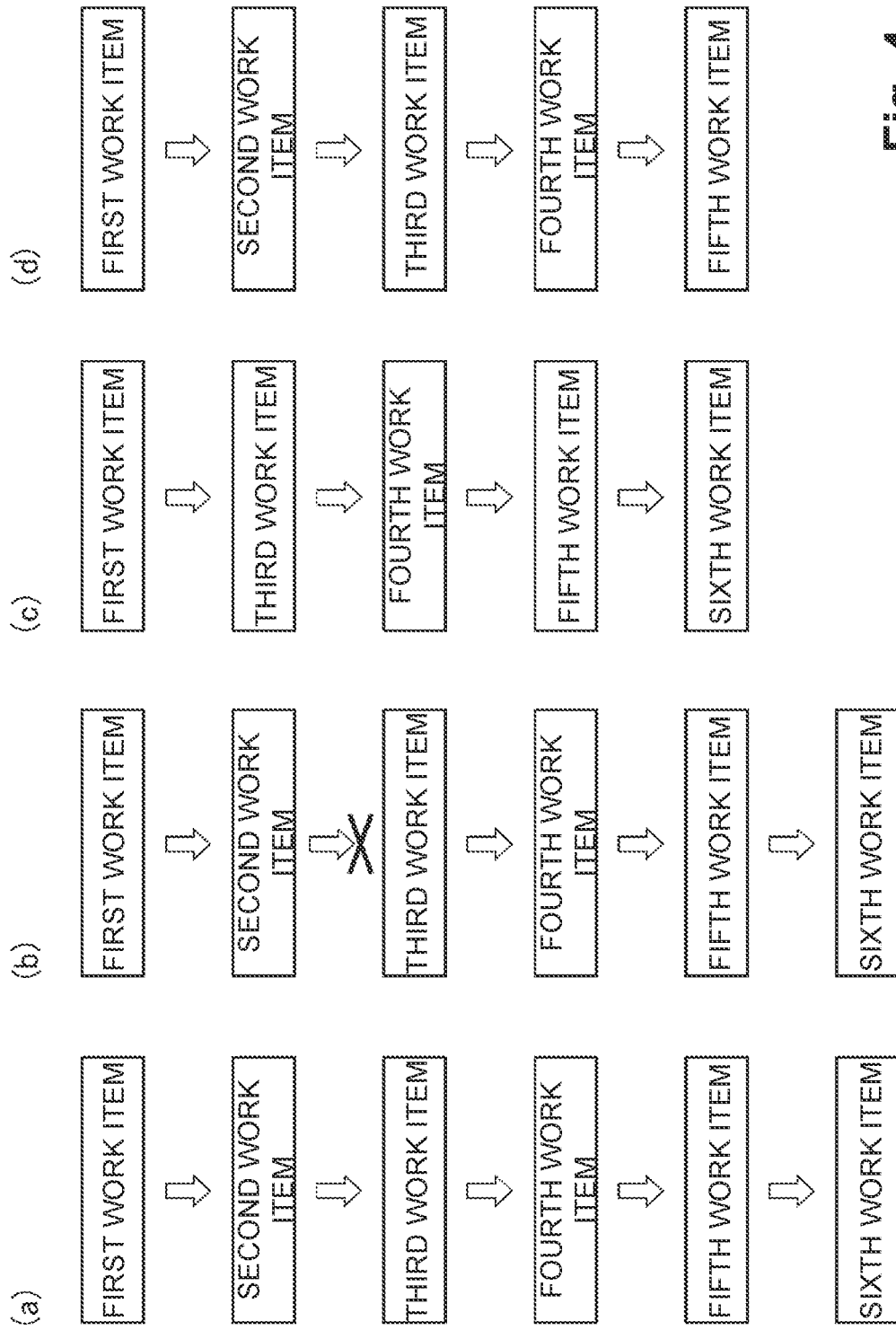
FIG. 4 is a diagram showing an example of restoration assist information that is generated or updated by the restoration work assist device of the one or more embodiments.

Next, the restoration assist information generation unit 332 rearranges the work items in the order of execution according to the priority information set in the extracted work items, and generates the restoration assist information for assisting the restoration work. FIG. 4(a) is an example of the restoration assist information generated by the restoration work assist device 30. As shown in FIG. 4(a), the generated restoration assist information includes six work items from a first work item to a sixth work item arranged in descending order of the priority.

Here, the first work item indicates a restoration work of the punch side finger 11 that is executed by moving the punch side finger 11 to a retreated end in the tool changer 1. The second work item indicates a restoration work of the die side finger 15 that is executed by moving the die side finger 15 to a retreated end in the tool changer 1. The third work item indicates a work of storing the punch 23 in the punch rack 13 by the punch stocker 14. The fourth work item indicates a work of storing the die 24 in the die rack 17 by the die stocker 18. The fifth work item indicates a work of retracting each component to a predetermined standby position. The sixth work item indicates a work of storing the tools on the tables. Specifically, the sixth work item indicates a work in which the punch 23 on the upper table 21 is gripped by the punch side finger 11 and stored in the punch rack 13, and the die 24 on the lower table 22 is gripped by the die side finger 15 and stored in the punch rack 13.

The generated restoration assist information is displayed on the display unit 32 by the display control unit 333 (S5). The worker recognizes the items of the restoration work and the execution order from the displayed restoration assist information, and starts the work from the first work item "restoration work of the punch side finger 11".

When the worker performs an operation to start the restoration work of the punch side finger 11, the information of the operation is acquired by the work execution status information acquisition unit 334 and sent to the restoration assist information generation unit 332. Upon acquiring the information of the operation, the restoration assist information generation unit 332 determines, from the information detected by the punch side finger sensor 12, an operation state of the punch side finger 11 and whether or not there is the punch 23 being gripped by the punch side finger 11. Then, based on the determined information, the restoration assist information generation unit 332 specifies a location of a button or the like to be operated in order to move the punch side finger 11 to the retreated end in the tool changer 1.

The display control unit 333 causes the display unit 32 to display information indicating the specified location. When the worker visually recognizes the displayed information and executes the operation, the punch side finger 11 is moved to the retreated end in the tool changer 1 and the work execution status information acquisition unit 334 acquires execution status information of the operation. Upon acquiring the execution status information of the operation, the work execution status information acquisition unit 334 recognizes that the work related to the first work item has been completed.

Next, when the worker performs an operation to start the second work item "restoration work of the die side finger 15," the restoration assist information generation unit 332 determines an operation state of the die side finger 15 and whether or not there is the die 24 being gripped by the die side finger 15, in the same manner as the processing described above. Then, based on the determined information, the restoration assist information generation unit 332 specifies a location of a button or the like to be operated in order to move the die side finger 15 to the retreated end in the tool changer 1.

The display control unit 333 causes the display unit 32 to display information indicating the specified location. When the worker visually recognizes the displayed information and executes the operation, the die side finger 15 is moved to the retreated end in the tool changer 1 and the work execution status information acquisition unit 334 acquires execution status information of the operation. Upon acquiring the execution status information of the operation, the work execution status information acquisition unit 334 recognizes that the work related to the second work item has been completed.

Here, it is assumed that the punch side finger 11 is displaced from an installation position and a new abnormality occurs ("YES" in S7, FIG. 4(b)) when an attempt is made to perform the work of storing the punch 23 by the punch stocker 14, which is the third work item, until the restoration work by the worker is completed ("NO" in S6), for example, after the work of the second work item is completed. FIG. 4(b) shows a timing at which the new abnormality has occurred during the restoration work based on the restoration assist information of FIG. 4(a).

When the punch side finger 11 is displaced from the installation position, the punch side finger sensor 12 detects the abnormality and the state information acquisition unit 331 acquires the detection information. When the state information acquisition unit 331 detects the abnormality of the punch side finger 11, the restoration assist information update unit 335 determines a work item needed to be executed thereafter (S8).

Specifically, the restoration assist information update unit 335 determines that among the first work item and the second work item that have already been executed, the first work item "restoration work of the punch side finger 11", which is related to the new abnormality, needs to be executed again, and the second work item "restoration work of the die side finger 15" does not need to be executed again. Further, the restoration assist information update unit 335 determines that the third work item to the sixth work item that have not been executed need to be executed thereafter. As a result, the restoration assist information update unit 335 determines that the work items that need to be executed thereafter are the first work item, and the third work item to the sixth work item.

Next, the restoration assist information update unit 335 rearranges the work items in the order of execution according to the priority information set for the work items determined to be necessary to be executed, and updates the restoration assist information generated in step S4. FIG. 4(c) is an example of the restoration assist information updated due to the occurrence of the new abnormality. As shown in FIG. 4(c), the restoration assist information updated here includes information configured so as to firstly execute the first work item that has the highest priority, and then to execute the third work item to the sixth work item in descending order of the priority.

Then, the content displayed on the display unit 32 is changed, by the display control unit 333, to updated new restoration assist information (S9). The worker recognizes, from the changed restoration assist information, the content and execution order of the restoration work including a measure against the newly generated abnormality, and continues the subsequent restoration work. The work related to each item is sequentially executed by the worker, and when all the restoration work is completed ("YES" in S6), the processing returns to step S1.

Further, a case will be described in which a new abnormality does not occur during the restoration work in step S7 ("NO" in S7) and the restoration assist information update unit 335 detects that a state of a predetermined location in the tool changer 1 has changed. For example, it is assumed that the punch side finger 11 is stopped in the upper table 21 without gripping the punch 23 because the tool changer 1 is stopped in step S3. Here, if the worker visually observes this, and before starting the restoration work, manually causes the punch side finger 11 to grip the punch 23 so that the punch 23 installed in the upper table 21 is stored in the punch rack 13, the punch side finger sensor 12 detects the gripping state.

The restoration assist information update unit 335 acquires the information detected by the punch side finger sensor 12 via the state information acquisition unit 331. The restoration assist information update unit 335 recognizes that the state of the punch 23 installed in the upper table 21 has changed to a state of being gripped by the punch side finger 11 ("YES" in S10).

As a result, the restoration assist information update unit 335 determines that the sixth work item "work of storing the tools on the tables" is no longer necessary and will be skipped (S11) based on the information of the location at which the change has occurred, the information of the state after the change, and the information acquired by the work execution status information acquisition unit 334. Then, the restoration assist information update unit 335 deletes information of the work item to be skipped in the restoration assist information generated in step S4, and updates the information as shown in FIG. 4(d). FIG. 4(d) is an example of the restoration assist information that is updated due to a change in a state of any location.

Then, the display control unit 333 changes the content displayed on the display unit 32 to the updated new restoration assist information (S9).

According to the one or more embodiments described above, it is possible to display the work items necessary for restoration and the execution order thereof as the restoration assist information when the abnormality occurs in the tool changer 1, and when the state in the equipment during the restoration work is changed, it is also possible to update the restoration assist information as appropriate according to the change. As a result, it is possible to provide assist information so that even a worker who has little experience in managing the tool changer 1 can appropriately perform the restoration work.

The present invention is not limited to the one or more embodiments described above, and various modifications can be made without departing from the summary of the present invention.

The present application claims priority based on Japanese Patent Application No. 2020-116799 filed with the Japan Patent Office on Jul. 7, 2020, and all the disclosure contents thereof are incorporated herein by reference.

The invention claimed is:

1. A device for assisting equipment restoration work, comprising:
    a restoration work information storage unit configured to store work item-items for restoration and priority information, the work item being set in advance for each location at which an abnormality is expected to occur in equipment to be managed, the priority information indicating a priority of execution for each of the work items;
    a state information acquisition unit configured to acquire state information of a predetermined location of the equipment, including operational status, sensor measurements, or detected abnormality data;
    a restoration assist information generation unit configured to generate, when it is detected that an abnormality has occurred in the equipment and an operation of the equipment has been stopped, restoration assist information, in which the work items for restoring the equipment are arranged in an order of execution according to the priority information, based on information of a location at which the abnormality has occurred and the information stored in the restoration work information storage unit, and wherein the restoration assist information further comprises associated information of each work item including at least one of work content, necessary tools, and precautionary measures; and
    a restoration assist information update unit configured to determine whether a work item that have already been executed needs to be executed again, and to update the restoration assist information generated by the restoration assist information generation unit to restoration assist information including the work item that have already been executed and determined to need to be executed again and the work items that have not been executed, and excluding the work item that have already been executed and determined not to need to be executed again, when it is detected that a state of any location in the equipment has changed based on the state information acquired by the state information acquisition unit during a restoration work based on the restoration assist information,
    wherein the update reflects a reprioritization of work items based on the changed state information.

2. The device for assisting equipment restoration work according to claim 1, further comprising a work execution status information acquisition unit configured to acquire information indicating an execution status for each of the work items included in the restoration assist information, wherein
    the restoration assist information update unit is configured to update, when it is detected that a new abnormality has occurred in the equipment before the work based on the restoration assist information is completed, the generated restoration assist information to new restoration assist information in which work items needed to be executed thereafter are arranged in an order of execution based on information of a location at which the new abnormality has occurred and the information acquired by the work execution status information acquisition unit.

3. The device for assisting equipment restoration work according to claim 1, wherein the restoration assist information update unit is configured to determine, when it is detected that a state of a predetermined location in the equipment has changed before the work based on the restoration assist information is completed, a work item to be skipped in the restoration assist information based on information of the location at which the state has changed, and is configured to update the generated restoration assist information to new restoration assist information in which the work item determined to be skipped is deleted.

4. A method for generating equipment restoration work assist information, comprising:
   storing, by a storage unit, work items for restoration and priority information, the work item being set in advance for each location at which an abnormality is expected to occur in equipment to be managed, the priority information indicating a priority of execution for each of the work items;
   acquiring state information of a predetermined location of the equipment;
   stopping an operation of the equipment in response to a detected abnormality based upon the acquired state information of the predetermined location of the equipment;
   generating, in response to the detected abnormality that has occurred in the equipment and the operation of the equipment has been stopped, restoration assist information, in which the work items for restoring the equipment are arranged in an order of execution according to the priority information, based on information of a location at which the abnormality has occurred and the information stored in the storage unit;
   automatically moving at least one of a punch side finger, a punch stocker, a die side finger, or a die stocker of the equipment in accordance with at least one of the work items;
   determining whether a work item that have already been executed needs to be executed again, when it is detected that a state of any location in the equipment has changed based on the state information during a restoration work based on the restoration assist information;
   updating the generated restoration assist information to restoration assist information including the work item that have already been executed and determined to need to be executed again and the work items that have not been executed, and excluding the work item that have already been executed and determined not to need to be executed again; and
   moving the at least one of the punch side finger, the punch stocker, the die side finger, or the die stocker of the equipment to a retreated end of the equipment in accordance with a completed work item.

5. A system for assisting equipment restoration work, comprising:
   a sheet metal bending machine;
   an automatic tool changer operatively coupled to the sheet metal bending machine;
   an NC device communicatively coupled to the sheet metal bending machine and the automatic tool changer, the NC device configured to control operations of the sheet metal bending machine and the tool changer; and
   a restoration work assist device communicatively coupled to the NC device and the automatic tool changer configured to communicate restoration assist information to the NC device;
   wherein the restoration work assist device comprises:
      a restoration work information storage unit configured to store, for each of a plurality of predetermined locations in the automatic tool changer, one or more restoration work items and priority information indicating a priority of execution for each of the restoration work items, and associated information including work content, necessary tools, and precautionary measures, wherein the restoration work items include at least tool change operations performed by the automatic tool changer associated with the sheet metal bending machine;
      a state information acquisition unit configured to acquire state information of a predetermined location of the automatic tool changer, the state information comprising operational status, sensor measurements, detected abnormalities, or tool usage status;
      a restoration assist information generation unit configured to:
         detect an occurrence of an abnormality in the automatic tool changer and stoppage of the automatic tool changer operation based on the acquired state information,
         identify a location at which the abnormality has occurred, and
         generate restoration assist information a sequence of restoration work items corresponding to the identified location, arranged in an order of execution according to the priority information, wherein the restoration assist information includes tool change operations if required, and associated work content, necessary tools, and precautionary measures for each work item; and
      a restoration assist information update unit configured to:
         detect a change in the state information of any location in the automatic tool changer before completion of a restoration work based on the restoration assist information, and
         update the restoration assist information based on the changed state information, wherein the restoration assist information comprises at least one of updating tool change operations or reprioritizing restoration work items.

* * * * *